June 26, 1934.  W. W. HARRIS  1,964,054
CLUTCH
Filed Nov. 16, 1931
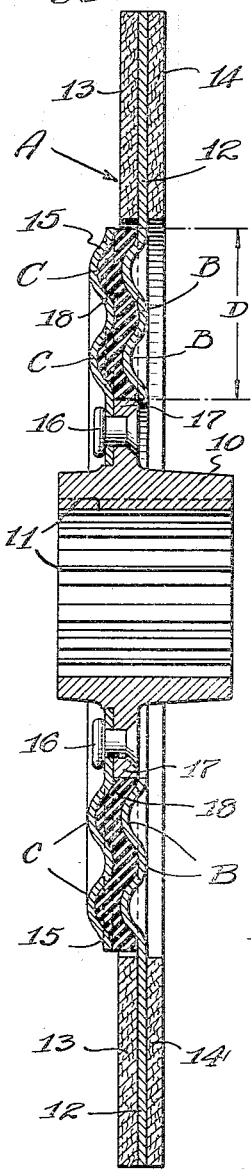
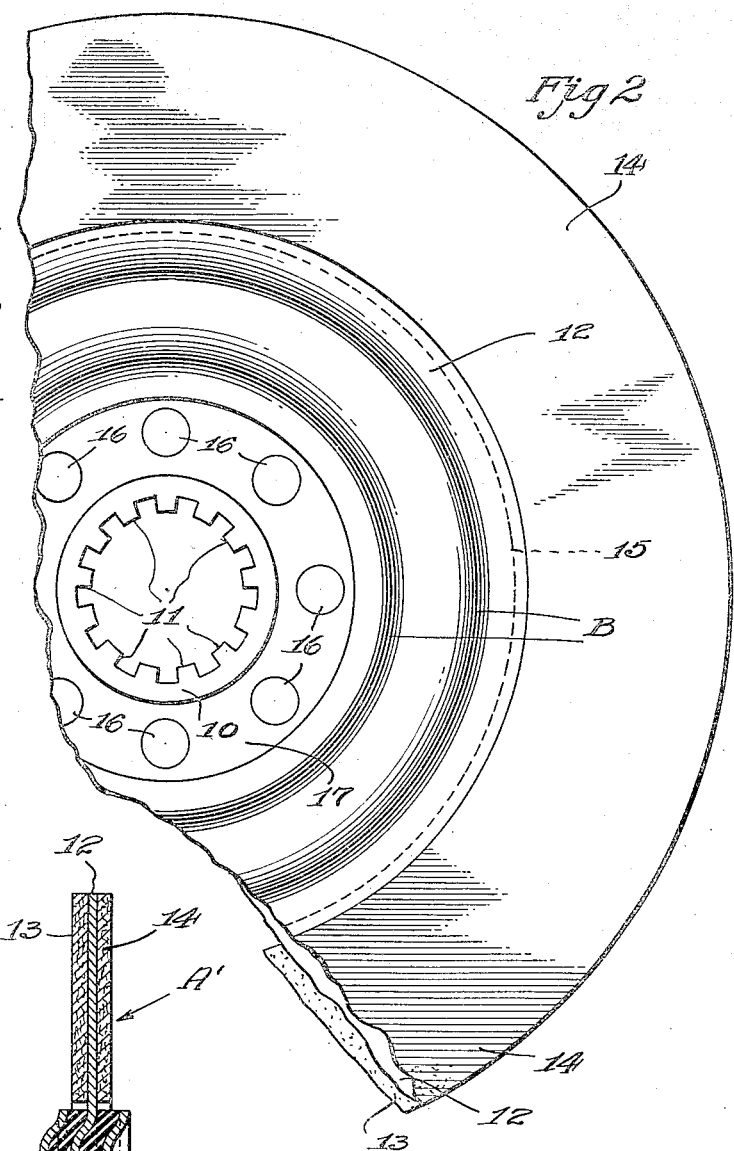
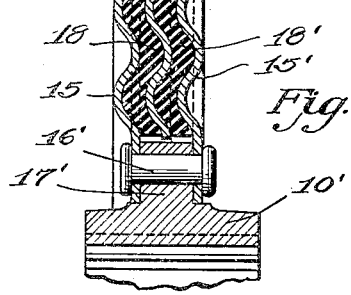
INVENTOR.
William W. Harris Patented June 26, 1934

1,964,054

UNITED STATES PATENT OFFICE 1,964,054

CLUTCH

William W. Harris, Detroit, Mich., assignor to Continental Motors Corporation, Detroit, Mich., a corporation of Virginia Application November 16, 1931, Serial No. 575,219

7 Claims. (Cl. 192—68)

This invention relates to clutches of the type used in motor vehicles although not necessarily limited thereto. My invention relates more particularly to improvements in clutch plates or discs ordinarily secured to the driven shaft and adapted for engagement between cooperating driving members such as the usual flywheel and pressure plate, such structures in general being well known in the art. By way of illustration my improved clutch plate may be used with my clutch shown and described in the co-pending application Ser. No. 502,189, filed December 13, 1930.

It is an object of my invention to provide improved means for yieldingly connecting the clutch plate to the hub, the latter being adapted for engagement with the usual driven shaft, whereby transmission and other noises and vibrations are eliminated by reason of their being absorbed in the clutch plate.

It is not broadly novel with my said invention to provide a yielding insert vulcanized in the clutch plate organization, such construction being disclosed in the co-pending application, Serial No. 567,669, filed October 8, 1931.

It is a further object of my invention to provide for an increased amount of driving contact, for a given space, between the yielding material and the disc portions vulcanized thereto. Thus my clutch plate is stronger and more efficient in operation. At the same time my clutch plate can be manufactured at very low cost.

It is a further object of my invention to provide a yielding clutch disc structure which is fixed against slipping between parts thereof which would give rise to objectionable wear and which does not require fastening devices.

I accomplish the aforesaid objects by vulcanizing a body of yielding material such as rubber intermediate co-operating undulated clutch disc portions at a suitable point.

Referring to the accompanying drawing illustrating several embodiments of my invention, Fig. 1 is a sectional view through the clutch plate, Fig. 2 is an elevational fragmentary view thereof, and Fig. 3 is a sectional view through a clutch plate of modified construction.

In the drawing reference character A represents the clutch plate or disc having a hub 10 formed with the usual teeth 11 for driving engagement with the usual driven shaft (not shown). The disc or plate member 12 carries the usual friction mats 13, 14 respectively engageable with the aforesaid cooperating driving elements, said plate member 12 radially overlapping a cooperating or auxiliary disc or plate member 15 spaced axially from plate member 12 and rigidly secured by rivets 16 to the radially extending annular hub shoulder 17. The space between the plate members 12 and 17 is filled with an annulus 18 of yielding material preferably rubber. This rubber annulus is vulcanized in assembly with the contacting faces of the plate members 12 and 15 whereby there is no relative movement between the rubber annulus and the plate members, the rubber yielding internally sufficiently to accomplish the said object of my invention. If desired the peaks and valleys may be formed by plane surfaces altho the curved form illustrated is preferred.

An important improvement provided by my invention resides in forming the plate members 12 and 15 where they overlap, with annular undulations indicated at B and C respectively. The undulations of each plate are preferably substantially sinuous in section (see Fig. 1) radially of the axis of hub 10. The annular peaks of one plate member are longitudinally aligned with the annular valleys of the other plate member and the rubber annulus 18 is preferably molded to fill the space between the plate members 12 and 15 and to conform with the undulations thereof as will be readily understood. By reason of the undulations as distinguished from flat parallel faces I have materially increased the area of vulcanized surface for a given available radial distance D for example. Thus the area of each vulcanized surface in my clutch disc structure is materially greater than the area determined by the distance D traced circumferentially of the disc.

In Fig. 3 the torque transmitted through the clutch plate A' is distributed over four vulcanized rubber and metal surfaces instead of two in Figs. 1 and 2. Thus the hub shoulder 17' of hub 10' is made wider to accommodate a second rubber annulus 18' and a second auxiliary clutch plate or disc member 15' cooperates therewith. Thus the rubber annuli 18 and 18' are each undulated and vulcanized to the clutch plate 12 of Figure 3 and also to the faces of the respective auxiliary clutch plate members 15 and 15', rivets 16' securing these members to the hub shoulder 17'.

It will be noted that the hub structure referred to in the claims includes hub parts 10, 17 and plate 15, while the disc structure includes plate 12 and friction mats 13, 14 although in referring to such structures I do not limit myself to the details of these parts or arrangements since other equivalent assemblies may be provided within the teaching of my invention.

The art of vulcanizing rubber to metal is well known and may be readily practiced by those familiar with such art. My invention does not relate to improvements in the vulcanizing art per se but in the application thereof in a novel manner to the clutch plate art for the accomplishment of new and useful results.

One advantage of my invention in the embodiments illustrated over prior art devices resides in subjecting the yielding material such as rubber to a shearing action as distinguished from compression whereby the rubber will not tend to deteriorate as in the case of rubber under compression.

What I claim as my invention is:

1. A clutch plate comprising a hub structure, a disc structure provided with friction material, said hub and disc structures presenting spaced radially overlapping cooperating annular undulated surfaces providing annular peaks and valleys, and yielding means between said cooperating surfaces, said means having surfaces complementary to the overlapping surfaces of said hub and disc structure and fixed thereto against relative movement at said surfaces.

2. A clutch plate comprising a hub structure, a disc structure provided with friction material, said hub and disc structures presenting spaced cooperating radially overlapping surfaces, and yielding means between said cooperating surfaces and fixed thereto against relative movement at said surfaces, said surfaces being extended out of planes respectively perpendicular with the hub axis whereby to increase the area of contact between said yielding means and said surfaces and to relatively increase the line of contact transverse to the forces tending to angularly move said hub and disc structure relative to each other.

3. A clutch plate comprising a hub structure, a disc structure provided with friction material, and a yielding member wave-like in radial cross-section intermediate the hub and disc structures and vulcanized thereto.

4. A clutch plate comprising a hub structure, a disc structure provided with friction material, said hub and disc structures presenting spaced cooperating surfaces wave-like in radial cross-section, and undulated yielding means between said cooperating surfaces and vulcanized thereto, said yielding means comprising a relatively thin-undulated annulus extending transversely to the axis of the hub structure and forming a yielding driving intermediary wave-like in radial cross-section.

5. A clutch plate comprising a hub structure, a disc structure, one of said structures having a pair of members axially spaced but radially overlapping a member included in the other of said structures, and undulated yielding material between said members, said material comprising a relatively thin annulus wave-like in radial cross-section extending transversely to the axis of the hub structure and secured to said members against relative surface movement.

6. A clutch plate comprising a hub structure, a disc structure, one of said structures having a pair of members each having annular peaks and valleys, said members being axially spaced but radially overlapping a wave-like member in radial cross-section included in the other of said structures, and a plurality of annular yielding elements in the spaces between said members, said elements each having wave-like surfaces in radial cross-section complementary to said members and vulcanized to said members.

7. A clutch plate having a hub, main and auxiliary discs, said main disc provided with friction material, said auxiliary disc rigidly secured to said hub, said discs presenting radially overlapping opposed surfaces in axially spaced relation relative to the hub axis, said surfaces having annular peaks and valleys, and a rubber member vulcanized to said opposed surfaces, said rubber member having peaks and valleys complementary to those of said surfaces.

WILLIAM W. HARRIS.